April 12, 1949.  C. H. NORDELL  2,467,150
VALVE
Filed Nov. 12, 1943  4 Sheets-Sheet 1
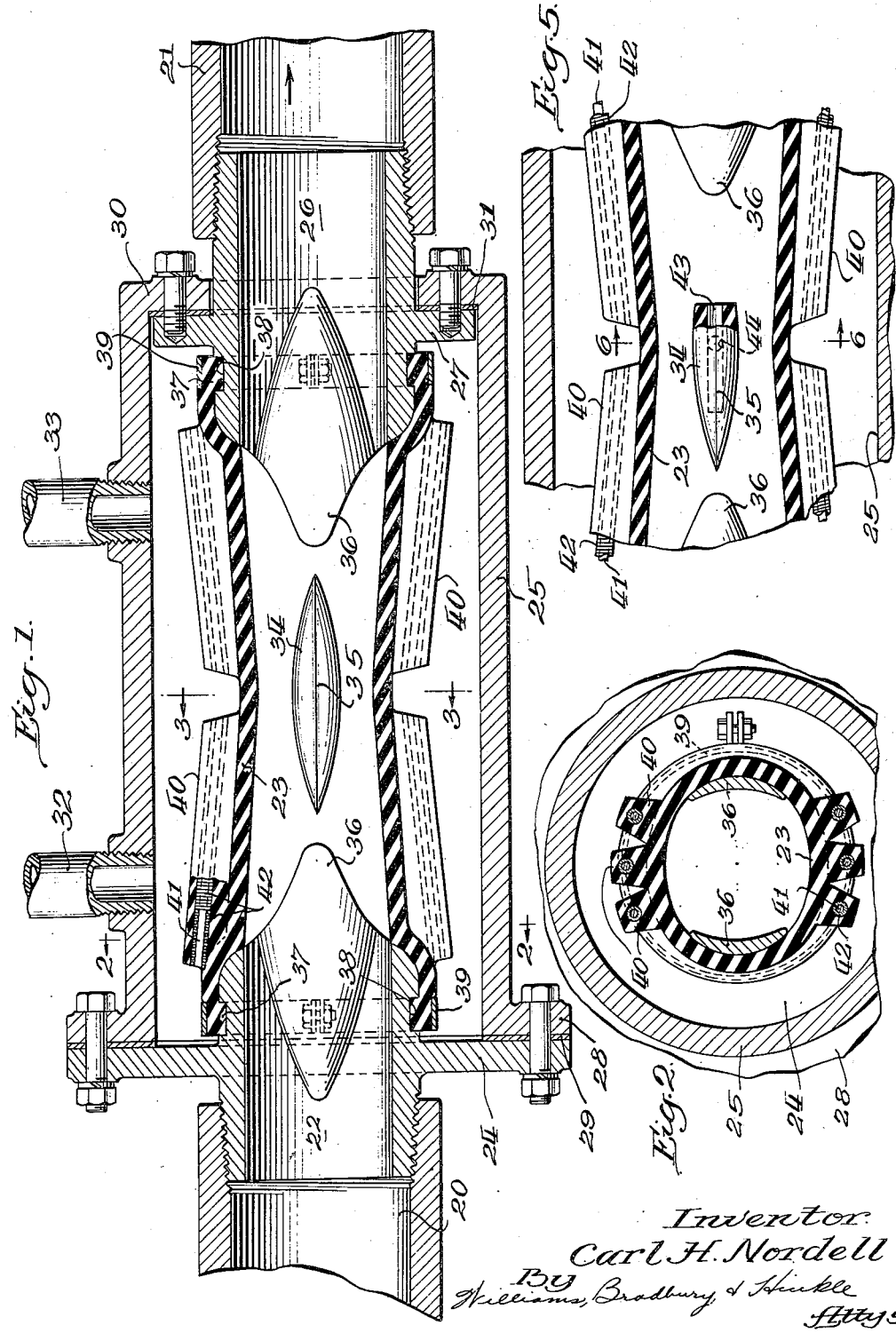
Inventor:
Carl H. Nordell
By Williams, Bradbury & Hinkle
Attys April 12, 1949.　　　　C. H. NORDELL　　　　2,467,150
VALVE Filed Nov. 12, 1943　　　　　　　　　　　　　　4 Sheets-Sheet 2

Inventor:
Carl H. Nordell
By Williams, Bradbury & Hinkle
Attys.

April 12, 1949. C. H. NORDELL 2,467,150
VALVE
Filed Nov. 12, 1943 4 Sheets-Sheet 3
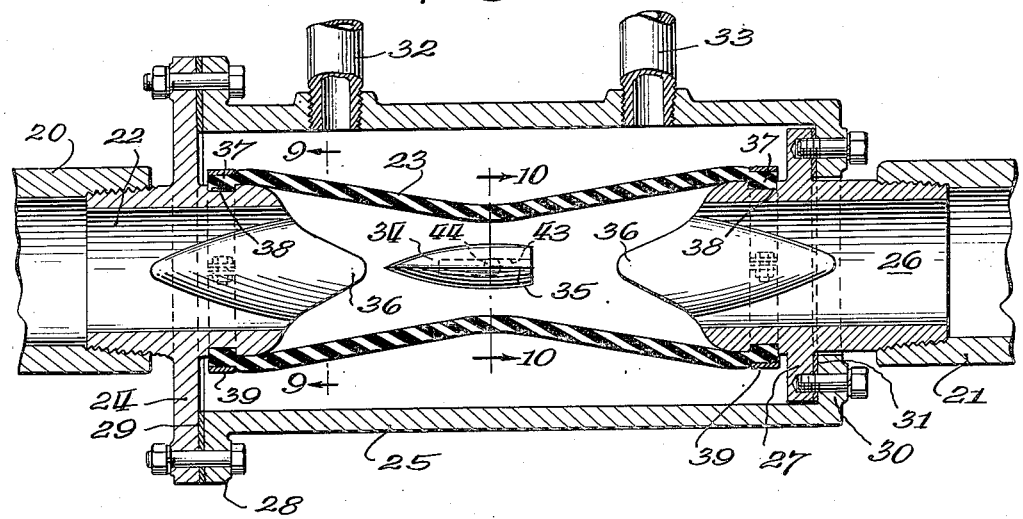
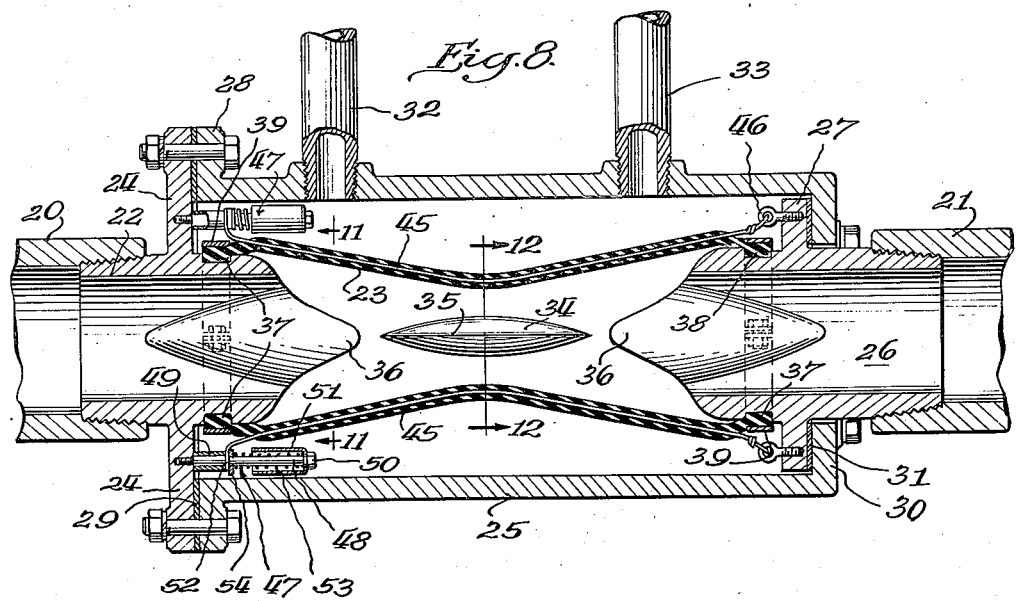
Inventor.
Carl H. Nordell
BY Williams, Bradbury, & Hinkle
Attys April 12, 1949.　　　C. H. NORDELL　　　2,467,150
VALVE
Filed Nov. 12, 1943　　　　　　　　　4 Sheets-Sheet 4
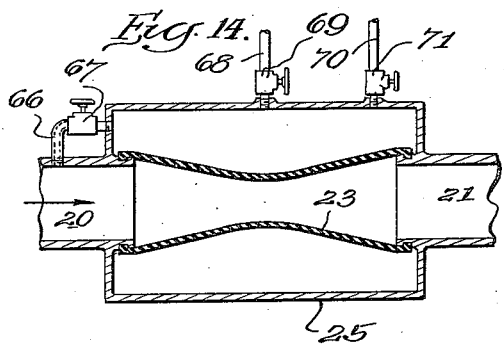
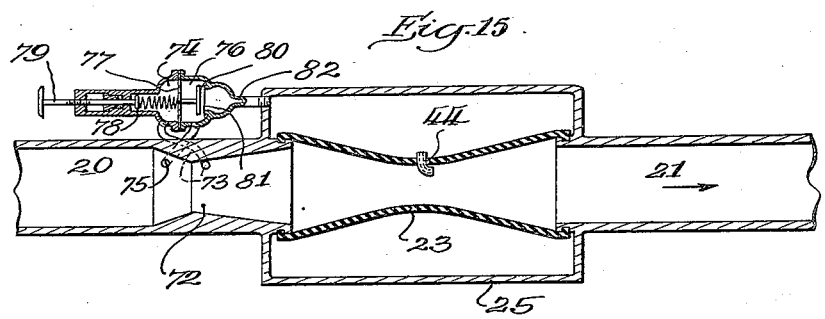
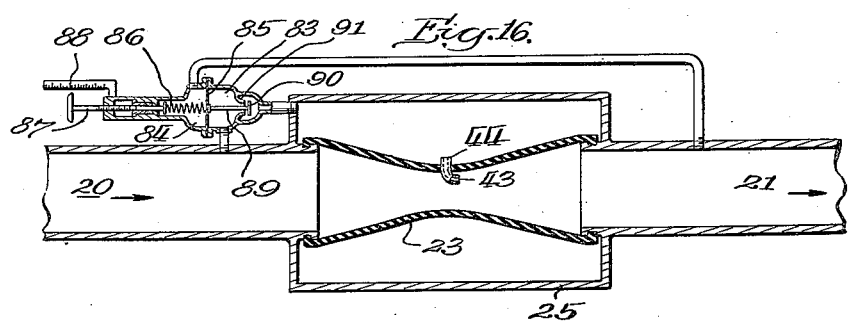
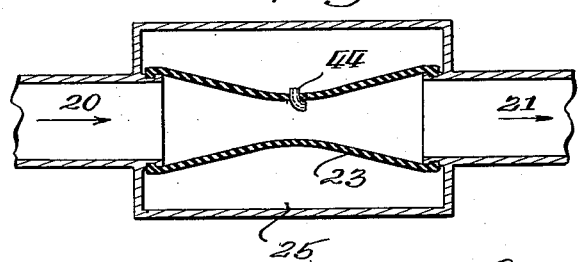
Inventor:
Carl H. Nordell
By
Williams, Bradbury & Hinkle
Attys.

Patented Apr. 12, 1949

2,467,150

UNITED STATES PATENT OFFICE 2,467,150

VALVE

Carl H. Nordell, Chicago, Ill.

Application November 12, 1943, Serial No. 509,963

12 Claims. (Cl. 137—139)

This invention relates to valves for controlling the flow of fluids in conduits.

One of the principal objects of the invention is to provide an improved valve which can readily be modified in various ways for the control of fluid passing through a conduit.

According to the present invention, I provide a valve in the form of a conduit section of flexible material so that the same may be deformed to prevent the passage of fluid. Means are provided for controlling the exterior and also the interior pressure to provide desired results. Preferably the interior of my deformable conduit section is wasted to some extent to provide a Venturi effect, the utilization of which will hereinafter be fully described.

The invention will readily be understood from the following description of preferred embodiments thereof taken in conjunction with the accompanying drawings, in which:

Fig. 1 is a longitudinal section through a valve embodying my invention;

Fig. 2 is a sectional view thereof taken on the line 2—2 of Fig. 1;

Fig. 5 is a fragmentary longitudinal section similar to Fig. 1, showing a modified form of flexible conduit;

Fig. 7 is a view similar to Fig. 1, showing a modified form of my invention;

Fig. 8 is another view similar to Fig. 1, showing still a further modified form of my invention;

Figs. 14 to 17 are diagrammatic sectional views showing different ways in which my improved valve may be put into operation.

Figure 3:
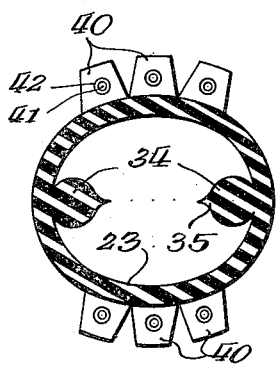
Fig. 3 is a sectional view of the flexible conduit taken on the line 3—3 of Fig. 1.

Referring to the drawings, and more particularly to Fig. 1, my improved valve is provided between an inlet conduit 20 and an outlet conduit 21. The conduit 20 has secured thereto a nipple 22, to which one end of a flexible valve body 23 is secured. The nipple 22 is provided with a flange 24 to which is secured one end of a housing 25 which surrounds the flexible valve member 23. The opposite end of the flexible valve member 23 is mounted upon a nipple 26 which is secured to one end of the conduit 21. The nipple 26 is provided with a flange 27 to which the housing member 25 is secured. The housing member 25 is provided adjacent the inlet end of the valve with an exterior flange 28 which is bolted to the flange 24, a suitable gasket 29 being interposed between the two flanges. At its other end the housing member 25 is provided with an inwardly directed flange 30 which is secured to the flange 27 by the aid of suitable screws, a suitable gasket 31 being provided between the two flanges.

It will readily be seen with reference to Fig. 1 that the flange 27 is located within the housing 25, whereas the flange 24 closes one end of the housing. In assembling the valve the flexible member 23 is secured to the nipples 22 and 26 and then the housing member 25 is slipped over the flange 27 until its flange 28 is brought into position adjacent the flange 24. During this assembly the gaskets 29 and 31 are placed in position and the assembly is finally bolted and screwed together. The valve is taken apart by releasing the housing member 25 and slipping it to the right, as viewed in Fig. 1, to uncover the flexible member 23. In Fig. 1 I have shown two conduits 32 and 33 communicating with the interior of the housing member 25. These conduits are employed for the purpose of controlling the supply and withdrawal of liquid from the housing 25, as will hereinafter be described with reference to Figs. 14 to 18, inclusive.

The flexible tubular member 23 is normally provided with a waisted formation so that the passage of liquid therethrough creates a certain Venturi effect. That is, the liquid passing through the somewhat constricted throat of the Venturi is accelerated with reference to the normal flow of the liquid. That acceleration is accompanied by a certain diminution of pressure. The flexible conduit member 23 is intended to close or to constrict owing to the production of an increased pressure within the housing 25.

Figure 4:
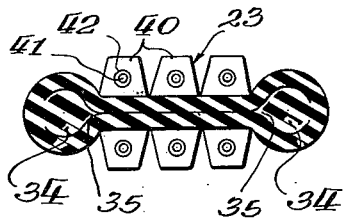
Fig. 4 is a similar view showing the flexible conduit collapsed.
Figure 9:
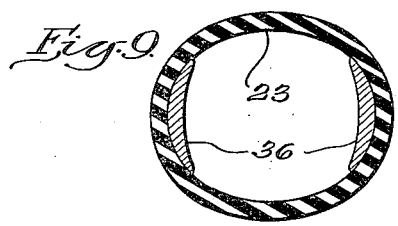
Fig. 9 is a sectional view taken on the line 9—9 of Fig. 7.

Fillet means are provided at opposite sides which are intended to occupy the edges of the flexible conduit when the same is closed. The fillet means may consist of substantially cigar-shaped bodies 34 which are rigidly mounted on diametrically opposite sides of the conduit member 23. The fillets 34 are substantially circular in cross-section, but their innermost sides are preferably provided with relatively sharp ribs 35. When the tubular member 23 is fully closed, as shown in Fig. 4, the material of the conduit member is wrapped around the surface of the fillets 34 and a sharp crease in the material of the conduit is avoided.

In order to insure that closure will take place by flexure in the zones of the fillets 34, I provide extensions 36 on diametrically opposite positions on the nipples 22 and 26, which extensions are in alignment with the fillets 34. The extensions 36 extend into the flexible conduit 23 to some extent, as shown in Fig. 1, and when the pressure within the housing 25 is increased and the flexible conduit 23 tends to contract, the extensions 36 substantially prevent relative approach of the fillets 34 and the adjacent portions of the conduit member 23. However, the increased pressure in the housing 25 is free to move the upper and lower portions of the conduit 23, as viewed in Fig. 1, towards each other. Continued increase of the pressure within the housing 25 causes complete collapse of the conduit member 23 in the manner shown in Fig. 4.

In the embodiment of the invention shown in Fig. 1, the flexible conduit member 23 may suitably be formed of rubber or other flexible material. At its ends the conduit 23 may suitably be provided with internal beads 37 which are received within grooves 38 in the nipples 22 and 26, respectively. The ends of the flexible conduit 23 are secured to the nipples 22 and 26 by means of metal straps 39 which are tightly mounted around the ends of the flexible conduit member 23, so as to hold firmly the beads 37 within the grooves 38.

When the valve is intended to be used for rapidly terminating a substantial flow of liquid through the conduits 20 and 21, means are preferably provided to enable the flexible conduit 23 to resist any tendency to be drawn into the conduit 21 by the inertia of the flowing stream. Thus, as shown in Figs. 1 to 5, I may form on the exterior of the tubular member 23 longitudinal ribs 40 which extend from points adjacent the ends of the tubular member 23 to a position somewhat short of the center of the tubular member. The ribs 40 are located on the upper and lower sides of the tubular member 23, as illustrated in the figures mentioned. That is, the upper series of ribs 40 is located half way between the two fillets 34, and the lower series of ribs is located approximately half way between these two fillets, the two series being located in diametric opposition.

The ribs 40 are made rigid in any suitable manner. For example, metal rods 41 may extend through each rib substantially from end to end. The rod 41 may be located within a space provided by a helical metal tube 42, this tube being inseparably secured to the material of the ribs 40. Thus the conduit 23 and the ribs 40 may be formed of rubber and the helical tubes 42 may be permanently installed during the vulcanizing operation. It will readily be understood that when the central portion of the conduit member 23 contracts, the upper and lower surfaces thereof, as viewed in Fig. 1, will increase in length. The ribs 40 will also increase in length to some extent and the tube 42 will likewise lengthen. The rods 41, however, maintain the ribs 40 straight and the tube is thus held against collapse towards the right, as viewed in Fig. 1.

For certain purposes it is preferred to provide limited communication from the interior of the housing 25 into the throat of the venturi constituted by the conduit 23. According to one method of obtaining this result I omit one end of the fillet 34, being that end on the downstream side. The fillet 34 is provided with a bore 43 which opens into the rear face of the fillet thus provided. The bore 43 communicates with a lateral bore 44 which leads to the exterior of the conduit member 23. It will readily be understood with reference to Fig. 5 that when liquid is flowing to the right, the partial vacuum or depression created by the Venturi formation of the conduit member 23 will be exerted on the bores 43 and 44 so that the reduced pressure is communicated to the interior of the housing 25. The control which is rendered possible by this communication of reduced pressure will be more fully described hereinafter.

The embodiment of the invention shown in Fig. 7 is not provided with supplemental means corresponding to the ribs 40 and associated elements. This type of valve is suitable for light work and is suitable for use as a regulating valve rather than a valve which is used to shut off the flow of liquid.

In the embodiment of the invention shown in Fig. 8, the reinforcing means is constituted by a circumferential series of wires 45 which extend through the material of which the conduit member is formed. This embodiment of the invention is more particularly adapted for use in connection with conduit members 23 formed of material of limited extensibility. The wires 45 are anchored to pins 46 which may be carried on the inner side of the flange 27, and to attachment devices 47 which are mounted on the interior of the flange 24. The attachment devices 47 comprise pins 48 which are screwed into the flange 24. Adjacent the flange 24 each pin 48 is surrounded by a spacer sleeve 49. The outer end of each pin 48 carries a head 50 against which abuts a sleeve 51.

Figure 11:
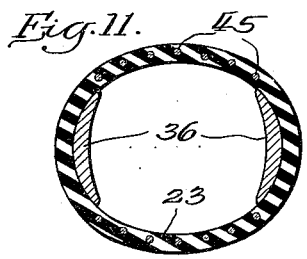
Fig. 11 is a sectional view taken on the line 11—11 of Fig. 8.
Figure 10:
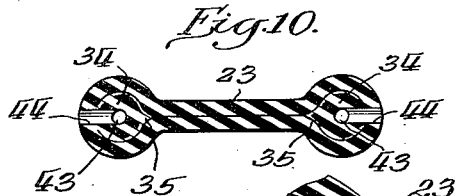
Fig. 10 is a sectional view taken on the line 10—10 of Fig. 7, the flexible conduit being collapsed.
Figure 12:
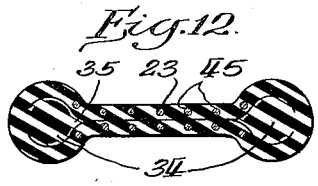
Fig. 12 is a sectional view taken on the line 12—12 of Fig. 8, the flexible conduit being collapsed.

Each wire 45 is provided at its end adjacent the flange 24 with a loop 52 through which passes the pin 48. This loop is adapted to bear against the inner end of the sleeve 49. A spring 53, one end of which bears against the end of the sleeve 51, normally forces a washer 54 against the loop 52. It will readily be understood that the valve in full open position occupies the relation shown in Figs. 8 and 11. When the pressure within the chamber 25 is increased sufficiently so as to cause the conduit member 23 to collapse into the position shown in Fig. 12, the loop 52 of each wire 45 moves to the right, as viewed in Fig. 8, against the compression of the spring 53. When the valve is fully closed the loops 52 are in engagement with the outermost ends of the sleeves 51. Consequently, any tendency for the closed valve to be torn away and carried through the outlet nipple 26 is effectively prevented.

Figure 13:
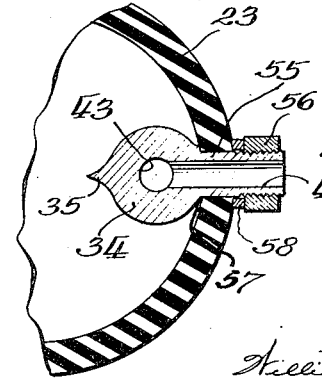
Fig. 13 is a sectional detailed view of a modified flexible conduit.

While the fillet 34 is preferably autogenous with the conduit member 23, it may be made of different material and installed in position by suitable means. Thus, as shown in Fig. 13, the fillet 34 may be formed of metal and it may be secured to the conduit member 23 by means of a hollow stem 55 which extends through a suitable opening in the conduit member 23. Leakproof connection between the fillet 34 and the conduit member 23 is insured by means of a nut 56 screwed on the exterior of the stem 55 so as to compress the conduit member 23 between a shoulder 57 on the fillet 34 and a washer 58 mounted on the stem adjacent the nut 56.

The improved valve may be employed in many different ways, certain of which are illustrated in the diagrammatic Figs. 14 to 18, inclusive. In these diagrammatic views, certain details of the structure are omitted, such as the fillets 34 and the reinforcing extensions 36. Thus, in Fig. 14, the inlet conduit 20 is connected to the interior of the chamber 25 through a plug 59 which is provided with a metering orifice; that is, an orifice of very small bore. The bore 44 communicates with a small chamber 60 which is rigidly mounted on the exterior of the flexible conduit member 23.

The chamber 60 is provided with a small orifice 61 which serves as a seat for a valve member 62 within the chamber 60. The valve member 62 is carried by a stem 63 which is threadedly mounted on a supporting plate 64. The plate 64 forms part of a packing gland through which the stem 63 extends to the exterior of the housing 25, where it is provided with an actuating handle 65.

In the embodiment of the invention shown in Fig. 14, the conduit 20 is connected to the chamber 25 by means of a pipe 66 controlled by valve 67. A pipe 68, controlled by valve 69, may be connected to a source of high pressure liquid. A pipe 70, controlled by a valve 71, may connect to a drain. If the valves 69 and 71 are closed and the valve 67 is opened, the conduit member 23 becomes closed owing to the fact that the pressure in the chamber 25 becomes greater than the pressure within the Venturi conduit 23. If the valves 67 and 71 are opened to appropriate relative positions, the conduit 23 may be maintained at any desired intermediate position. Control can be effected independently of the liquid in the conduit 20 by closing the valve 67 and actuating the valves 69 and 71 as desired.

In the embodiment of the invention shown in Fig. 15, the valve is arranged to give a constant flow of liquid, irrespective of variations in the pressure. Within the conduit 20 I provide an auxiliary venturi 72, the throat of which is connected by a duct 73 to a chamber 74. I connect the inlet conduit 20 by means of a duct 75 to a chamber 76. The two chambers 74 and 76 are separated from each other by means of a flexible diaphragm 77. This diaphragm is subjected to a compression spring 78, the pressure of which may be controlled by a manually actuated stem 79.

Figure 6:
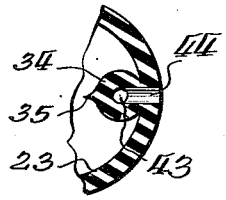
Fig. 6 is a fragmentary section thereof, the section being taken on the line 6—6 of Fig. 5.

The diaphragm 74 carries within the chamber 76 a valve member 80 which is adapted to engage a seat 81 which controls an outlet 82 from the chamber 76 to the housing 25. The interior of the flexible conduit 23 is in communication with the housing 25 through a duct 44. When the stem 79 is screwed inwardly, the compression of the spring 78 is increased and, consequently, the diaphragm 77 is moved to the right, as viewed in Fig. 6, to some extent. This movement tends to seat the valve 80.

The pressure within the chamber 25 depends upon the degree of opening of the valve 80 and the degree of constriction through the duct 44. In the event that the pressure applied to the conduit 20 increases, there will be a tendency for an increased flow through the venturi 72. Such an increased flow would produce a greater pressure in the chamber 76 than would prevail in the chamber 74. Consequently, the valve 80 would open slightly and the pressure within the chamber 25 would be increased. This increase of pressure would cause a contraction of the flexible conduit 23 which would correct the rate of flow so that it would remain substantially constant. Of course, the rate of flow depends upon the setting of the stem 79 and the valve may be set for any rate of flow desired, within the limits of the device.

In the embodiment of the invention shown in Fig. 16, the inlet conduit 20 is connected to a chamber 83 and the outlet conduit 21 is connected to a chamber 84. The two chambers are separated by a diaphragm 85 which is biased towards the left, as viewed in Fig. 17, by means of a tension spring 86. The degree of tension of the spring 86 may be controlled by a manually operated stem 87. The handle of this stem may be associated with a pressure indicating scale 88.

Within the chamber 83 the diaphragm 85 carries a valve stem 89. The valve stem 89 carries a valve member 90 which cooperates with a seat 91 so as to control flow from chamber 83 into the housing 25. If the stem 87 is adjusted to a definite position, then the tension spring 86 biases the valve member 90 into throttling relation with the seat 91. Consequently, a certain limited flow passes from the conduit 20 into the chamber 25 and the pressure prevailing within the chamber 25 depends upon the degree of throttling at the valve 90 and in the duct 44.

In general, this pressure within the chamber 25 results in a partial contraction of the flexible conduit 23. As a result of this contraction, the pressure of the liquid in the conduit 21 is lower than that prevailing in the conduit 20. In the event that the pressure in the conduit 21 decreases, then the pressure in the chamber 84 decreases and the diaphragm 85 moves to the left, as viewed in Fig. 16, thus closing the valve 90 to a greater extent. This closure of the valve 90 decreases the pressure within the chamber 25, with the result that the flexible conduit member 23 extends and the pressure in the conduit 21 is increased.

If, however, the pressure in the conduit 21 tends to increase above that determined by the position of the stem 87, the increase of the pressure in the chamber 84 decreases the throttling at the valve 90. Thus, the pressure within the chamber 25 is increased and the flexible conduit 23 is partially closed to reduce the pressure in the conduit 21. In this embodiment of the invention the flexible conduit is preferably biased to closed position, for example, it may be formed of rubber biased in that manner. Consequently, if the flow through the conduits 20 and 21 is completely closed off, the flexible conduit 23 will automatically close and, consequently, when the flow is resumed initial surge will be prevented.

In Fig. 17 I show my improved valve employed as a simple check valve. This valve permits flow to the right, as viewed in Fig. 17, since the low pressure created in the throat of the venturi by that flow is communicated through the duct 44 to the chamber 25. Thus, the flexible conduit 23 is opened to its fullest extent. If, however, the flow tends to reverse, the impact of the flow on the duct 43 raises the pressure within the chamber 25 so that the flexible conduit member 25 collapses, thus terminating that flow.

Although the invention has been described in connection with the specific details of a preferred embodiment thereof, it must be understood that such details are not intended to be limitative of the invention except in so far as set forth in the accompanying claims.

Having thus described my invention, what I claim as new and desire to secure by Letters Patent of the United States is:

1. A valve comprising a flexible conduit member which is venturi formed when fully extended, a chamber enclosing said flexible conduit member, and means for controlling the pressure in said chamber and in said flexible conduit, whereby to make said flexible conduit contract and expand to control flow therethrough, said flexible conduit being provided with an opening between its exterior and its interior at a point adjacent the throat of the venturi.

2. A valve comprising an inlet member, an outlet member, a flexible conduit extending therebetween, said conduit being adapted to be collapsed to regulate and prevent flow from the inlet to the outlet, means for controlling the collapse of said flexible conduit member, and reinforcing means for said conduit member disposed externally of said member and attached thereto, whereby any tendency for the conduit member to be dragged into the outlet member is effectively prevented.

3. A valve comprising an inlet member, an outlet member, a flexible conduit extending therebetween, said conduit being adapted to be collapsed to regulate and prevent flow from the inlet to the outlet, and comparatively rigid members reinforcing the conduit from about the middle point therealong to a point adjacent to said outlet member for preventing the conduit from collapsing longitudinally.

4. A valve comprising an inlet member, an outlet member, a flexible conduit extending therebetween, said conduit being adapted to be collapsed to regulate and prevent flow from the inlet to the outlet, means for controlling the collapse of said flexible conduit member, and rigid members extending from positions adjacent the ends of the flexible conduit member to positions adjacent the center thereof for rendering said flexible conduit member substantially rigid when collapsed.

5. A valve comprising an inlet member, an outlet member, a flexible conduit extending therebetween, said conduit being adapted to be collapsed to regulate and prevent flow from the inlet to the outlet, means for controlling the collapse of said flexible conduit member, said flexible conduit member being provided with ribs which extend from points adjacent the ends of the flexible conduit member to points adjacent but short of the center of the flexible conduit member, and rigid rods within said ribs to prevent the same from bending.

6. In a valve, a flexible conduit member having a Venturi formation, and substantially rounded fillets at opposite sides whereby said flexible conduit may be closed by collapse at its center without the production of a sharp seam.

7. In a valve, a flexible conduit member having a Venturi formation, and fillets of generally round cross-section, with tapering ends, at opposite sides whereby said flexible conduit may be closed by collapse at its center without the production of a sharp seam.

8. In a valve, a flexible conduit member having a Venturi formation, and fillets of generally round cross-section, with tapering ends, at opposite sides whereby said flexible conduit may be closed by collapse at its center without the production of a sharp seam, one of said fillets having a flat end, and a duct being formed from said flat end to the exterior of the flexible conduit member.

9. A valve comrising a rigid inlet member, a rigid outlet member and a flexible conduit member therebetween, a chamber enclosing said flexible conduit member, means for regulating the pressure within said chamber, said flexible conduit member having fillets of generally rounded form at diametrically opposite positions and said inlet member and outlet member having portions projecting into said flexible conduit member in alignment with said fillets whereby the flexible conduit member is adapted to be collapsed in such a manner that the fillets are located at opposite sides of the flattened conduit member.

10. A valve comprising an inlet, an outlet, a flexible collapsible conduit member of Venturi formation extending therebetween, a chamber enclosing said flexible conduit member, means providing a limited communication between the throat of the venturi and the exterior of the flexible conduit member, a valve controlled by the pressure on the downstream side of the conduit member, and a conduit extending from the upstream side of said flexible member to said chamber, last said conduit being controlled by last said valve whereby substantially constant pressure is maintained on the downstream side.

11. A valve comprising an inlet, an outlet, a flexible collapsible conduit member of Venturi formation inherently biased towards closing position extending therebetween, a chamber enclosing said flexible conduit member, means providing a limited communication between the throat of the venturi and the exterior of the flexible conduit member, a valve controlled by the pressure on the downstream side of the conduit member, and a conduit extending from the upstream side of said flexible member to said chamber, last said conduit being controlled by last said valve whereby substantially constant pressure is maintained on the downstream side.

12. A valve comprising an inlet, an outlet, a flexible collapsible conduit member of Venturi formation inherently biased towards closing position extending therebetween, a chamber enclosing said flexible conduit member, means providing a limited communication between the throat of the venturi and the exterior of the flexible conduit member, a valve controlled by the pressure on the downstream side of the conduit member, a conduit extending from the upstream side of said flexible member to said chamber, last said conduit being controlled by last said valve, and means for adjusting last said valve whereby a substantially constant pressure of desired magnitude is maintained on the downstream side.

CARL H. NORDELL.

REFERENCES CITED

The following references are of record in the file of this patent:

UNITED STATES PATENTS

| Number | Name | Date |
|---|---|---|
| 844,410 | Schauer | Feb. 19, 1907 |
| 994,167 | Koppitz | June 6, 1911 |
| 1,284,465 | Ryan | Nov. 12, 1918 |
| 1,731,571 | Heare | Oct. 15, 1929 |
| 2,069,261 | Monnet | Feb. 2, 1937 |
| 2,317,376 | Grove | Apr. 27, 1943 |
| 2,417,994 | Sheets | Mar. 25, 1947 |

FOREIGN PATENTS

| Number | Country | Date |
|---|---|---|
| 30,976 | Switzerland | Jan. 25, 1904 |
| 179,538 | Germany | Dec. 7, 1906 |
| 504,449 | Germany | Aug. 4, 1930 |